(12) United States Patent
Breitenbach et al.

(10) Patent No.: US 11,641,284 B2
(45) Date of Patent: May 2, 2023

(54) SYSTEM, MACHINE, METHOD FOR CONFIGURING A SYSTEM AND METHOD FOR OPERATING A MACHINE

(71) Applicant: Robert Bosch GmbH, Stuttgart (DE)

(72) Inventors: Alexander Breitenbach, Frammersbach (DE); Julien Rausch, Gemuenden (DE); Tobias Buhlinger, Rodgau (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 17/062,101

(22) Filed: Oct. 2, 2020

(65) Prior Publication Data
US 2021/0126798 A1 Apr. 29, 2021

(30) Foreign Application Priority Data
Oct. 28, 2019 (DE) ...................... 10 2019 216 533.8

(51) Int. Cl.
| | | |
|---|---|---|
| *H04L 9/32* | (2006.01) | |
| *H04L 9/08* | (2006.01) | |
| *G06F 9/50* | (2006.01) | |
| *G06F 9/48* | (2006.01) | |
| *H04L 9/00* | (2022.01) | |

(52) U.S. Cl.
CPC .......... *H04L 9/3265* (2013.01); *G06F 9/4856* (2013.01); *G06F 9/5038* (2013.01); *G06F 9/5072* (2013.01); *H04L 9/006* (2013.01); *H04L 9/0827* (2013.01)

(58) Field of Classification Search
CPC ..... H04L 9/3265; H04L 9/006; H04L 9/0827; H04L 9/3247; H04L 63/0823; H04L 9/3268; H04L 9/3263; G06F 9/4856; G06F 9/5038; G06F 9/5072; G06F 21/44; G06F 21/45
See application file for complete search history.

(56) References Cited

U.S. PATENT DOCUMENTS

| | | | |
|---|---|---|---|
| 2002/0029200 A1* | 3/2002 | Dulin ................. | H04L 63/0823 |
| | | | 705/67 |
| 2005/0132202 A1* | 6/2005 | Dillaway ............. | H04L 9/3265 |
| | | | 713/179 |

(Continued)

OTHER PUBLICATIONS

Doug Beattie, "What Are Subordinate CAs and Why Would You Want Your Own?", Sep. 11, 2018, obtained online from <https://www.globalsign.com/en/blog/what-is-an-intermediate-or-subordinate-certificate-authority>, retrieved on Aug. 27, 2022 (Year: 2018).*

*Primary Examiner* — Farid Homayounmehr
*Assistant Examiner* — Zhimei Zhu
(74) *Attorney, Agent, or Firm* — Maginot, Moore & Beck LLP

(57) ABSTRACT

A system has at least one machine, including at least one device for exchanging data with another device of the at least one machine or of another machine for a joint solution of a task or with a higher-level device. The system further including a certification device configured to identify the at least one machine with a root certificate and configured to grant a sub-certificate to the at least one device of the machine. The certification device is further configured to sign the sub-certificate with the root certificate of the at least one machine in order to identify the at least one device as belonging to the at least one machine, and the sub-certificate is issued biuniquely for the at least one device.

10 Claims, 2 Drawing Sheets

(56) References Cited

U.S. PATENT DOCUMENTS

| | | | |
|---|---|---|---|
| 2006/0053291 A1* | 3/2006 | Brown | H04L 9/3265 713/175 |
| 2015/0046701 A1* | 2/2015 | Rooyakkers | G06F 21/44 713/155 |
| 2016/0112406 A1* | 4/2016 | Bugrov | H04L 63/102 726/10 |
| 2018/0198628 A1* | 7/2018 | Hojsik | H04L 9/3247 |
| 2019/0074980 A1* | 3/2019 | Loreskar | H04W 12/06 |
| 2019/0236313 A1* | 8/2019 | Bush | H04L 63/0823 |
| 2021/0124846 A1* | 4/2021 | Buhlinger | H04L 9/3263 |

* cited by examiner

SYSTEM, MACHINE, METHOD FOR CONFIGURING A SYSTEM AND METHOD FOR OPERATING A MACHINE

This application claims priority under 35 U.S.C. § 119 to patent application no. DE 10 2019 216 533.8, filed on Oct. 28, 2019 in Germany, the disclosure of which is incorporated herein by reference in its entirety.

The disclosure relates to a system, a machine, a method for configuring such a system and a method for operating such a machine.

BACKGROUND

A machine or industrial plant has a plurality of devices that cooperate to solve a task. The devices exchange data with each other, such as sensor data, i.e. actual values from the operation of the machine, or control commands with setpoint values for controlling a drive, or similar. In addition, in some applications data are transmitted to devices that are located externally to the machine or industrial plant. Such devices are, for example, higher-level control systems or data management systems. The devices may also store and use data from other machines or industrial plants. This means that a large number of data items must be managed both in the machine and in the externally arranged devices.

A problem occurs when data is imported into a machine from an external source, which, for example, corrupts data from sensors in the machine or specifies different, in the worst case, incorrect, setpoint values. This allows the operation of the machine to be manipulated. This can lead to at least undesirable results in machine operation, or even to dangerous states of the machine.

Another problem is the fact that machines have a plurality of identical sensors, for example. If a plurality of identical machines is also present, it is not always possible to determine which sensor produced the data or which sensor belongs to which machine. In some cases, tracing the origin of the individual data items on a one-to-one basis later is no longer possible at all, or is currently very complicated and expensive. This often makes it difficult to find the cause of the fault in the event of a machine malfunction.

All this is also unacceptable in terms of the safety of machinery, particularly in the industrial environment, where there are predetermined safety requirements.

SUMMARY

The object of the disclosure is to provide a system, a machine, a method for configuring such a system and a method for operating such a machine, with which the problems described above can be solved. In particular, a system, a machine, a method for configuring such a system and a method for operating such a machine are to be provided, with which the operation of a machine is possible with a high level of safety and without long, unplanned downtimes.

The above-mentioned object is achieved by a system as described herein. The system has at least one machine having at least one device for exchanging data with another device of the machine or with another machine for the joint solution of a task or with a higher-level device, and having a certification device which is designed to identify the at least one machine with a root certificate and to grant a sub-certificate to the at least one device of the machine, wherein the certification device is designed to sign the sub-certificate with the root certificate of the machine in order to identify the device as belonging to the machine, and wherein the sub-certificate is issued biuniquely for the device.

The system is designed in such a way that each device can be assigned biuniquely to a machine. Along with the data exchanged between the devices, information about the respective device that generated the data is also transmitted. This ensures traceability of the origin of all data relating to the machine and thus guarantees the security of both the data and the operation of the machine.

As a result, the machine can also be integrated into a machine complex in which at least one other machine is arranged, wherein the origin of the data from the individual machines can always be easily and biuniquely determined. This also makes it possible to assign data biuniquely from, for example, a plurality of industrial control devices for controlling peripherals that are connected to the drives and/or at least one industrial control device via logic modules or drive devices. The manipulation of data is therefore at least more difficult than before.

In addition, the data from different devices can no longer be easily confused. This contributes to the correct use of the data and thus to machine reliability.

In addition, cryptography can be used with the certificates in a straightforward way. This enables the machine to acquire the capability to easily generate automatically, for example, a forgery-proof representation of the communication relationships of the machine or machine complexes. This improves the operability of the machine or machine complex. This also increases the reliability of the machine or the machine complex, as errors can be discovered more quickly. This also helps to keep machine downtimes as infrequent and short as possible.

Overall, the machine described above allows for a very simple, safe and reliable operation of the machine or a higher-level machine complex or a higher-level industrial plant. It is then possible to react quickly to the operating states of the machine as they occur. All these properties result in a very efficient operation of the machine.

The certification device can have a private key which contains a public key, and the certification device is designed to use the private key for signing the root certificate for the machine.

The at least one device may potentially have a private key that contains a public key, with the at least one device being configured to send its public key to the certification device so that the certification device issues the sub-certificate, and the certification device being designed to sign the public key of the device with the root certificate of the machine in order to issue the sub-certificate for the device.

As an option, one of the devices is a control device and another of the devices is a drive device or a tool or a transport device.

It is conceivable that the at least one device of the machine is designed to permit an exchange of data during data exchange with another device of the machine or the other machine or the higher-level device, only if the data is accompanied by a sub-certificate signed with the root certificate.

In a specific design, the data can be operating-state data or can comprise a control command of a device.

In another specific design, the data comprise parameters that can be used in controlling the drive of at least one element of the machine.

In yet another specific design, the data comprise an IP address and/or a name of the device.

The system described above may additionally have a device arranged externally to the at least one machine, wherein the device stores the root certificate of the at least one machine and the device is designed to check data received from a device of the at least one machine for trustworthiness, using the root certificate of the at least one machine.

The above-mentioned object is also achieved by a machine as described herein. The machine has at least one device for exchanging data with another device of the machine or another machine for the joint solution of a task or with a higher-level device, and a certification device that is designed to issue a sub-certificate to the at least one device of the machine, wherein the certification device is designed to identify the device as belonging to the machine, to sign the sub-certificate with a root certificate of the machine which was issued by a higher-level certification device, and wherein the sub-certificate is assigned biuniquely to the device.

The above-mentioned object is also achieved by a method for configuring a system, as described herein. The system has at least one machine which comprises at least one device for exchanging data with another device of the machine or another machine for the joint solution of a task, or with a higher-level device. In addition, the system has a certification device. The method has the steps of identifying, using the certification device, the at least one machine with a root certificate, granting, using the certification device, a sub-certificate to the at least one device of the machine by the certification device signing the sub-certificate with the root certificate of the machine in order to identify the device as belonging to the machine, wherein the sub-certificate for the device is issued biuniquely.

The above-mentioned object is also achieved by a method for operating a machine as described herein. The machine has at least one device for exchanging data with another device of the machine or another machine for the joint solution of a task or with a higher-level device, said method having the steps of preparing data for sending to the device which is arranged externally to the at least one machine and which stores the root certificate of the at least one machine, adding a sub-certificate to the prepared data, wherein the sub-certificate is signed with a root certificate of a certification device of the machine in order to identify the device as belonging to the machine, and wherein the sub-certificate for the device is issued biuniquely, and checking, using the device, the data received from a device of the at least one machine for trustworthiness with the root certificate of the at least one machine.

The methods achieve the same advantages as those cited above in relation to the machine.

Further possible implementations of the disclosure also comprise combinations of features of the disclosure either described previously or in the following in relation to the exemplary embodiments, which are not explicitly mentioned. A person skilled in the art will also be able to add individual aspects as improvements or additions to each basic form of the disclosure.

BRIEF DESCRIPTION OF THE DRAWINGS

Hereafter, the disclosure is described in more detail with reference to the attached drawing and on the basis of exemplary embodiments. In the figures.

In all figures, identical or functionally equivalent elements are labelled with the same reference signs, unless otherwise indicated.

DETAILED DESCRIPTION

Figure 1:
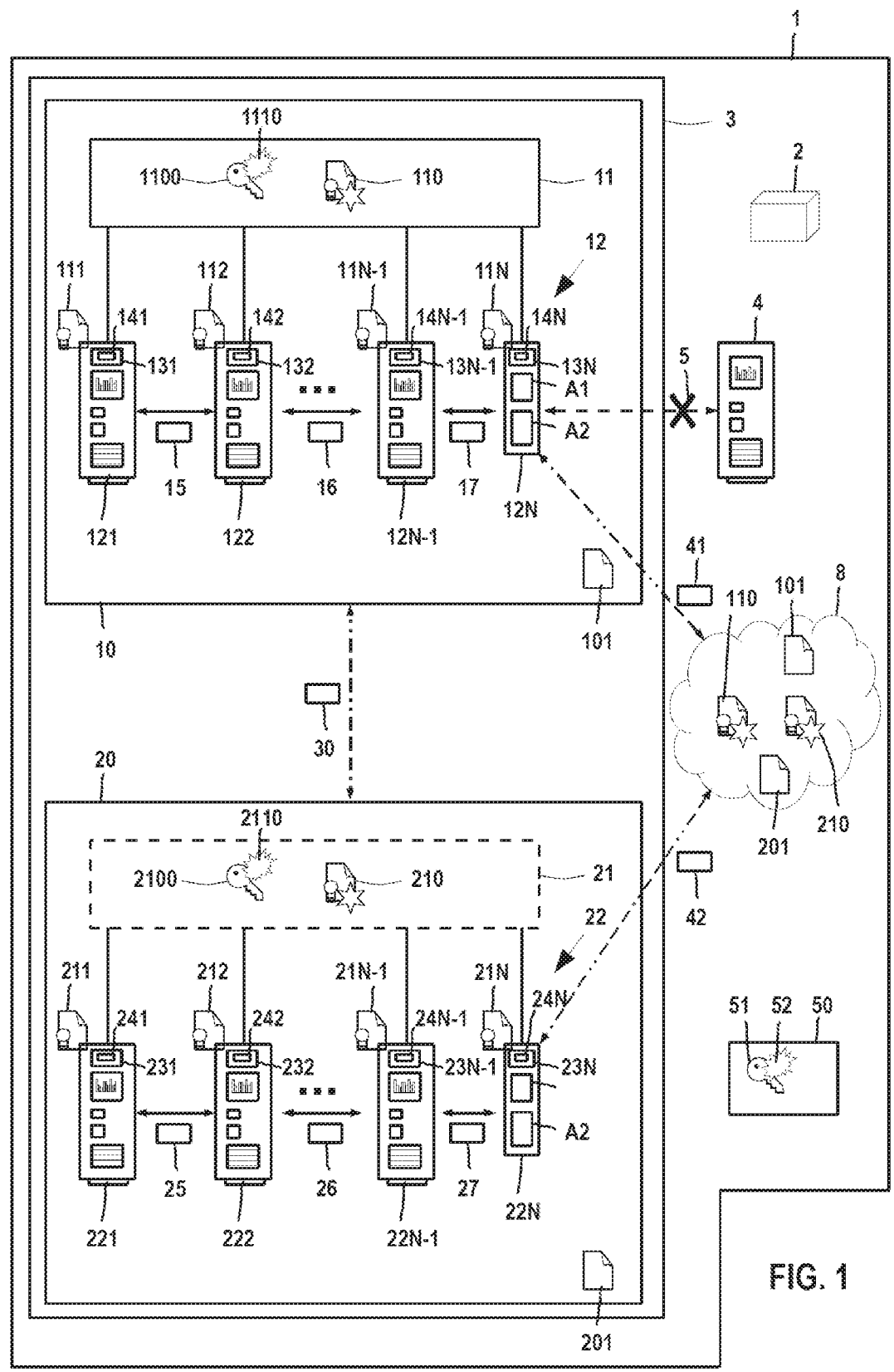
FIG. 1 shows a block diagram of a system with a plurality of machines and a control device arranged externally to it, according to a first exemplary embodiment.

FIG. 1 schematically shows a system 1 according to a first exemplary embodiment, in which objects 2 can be treated. The system 1 has a machine complex 3 with a first and a second machine 10, 20, which can exchange data 30 with each other. In addition, the system 1 has a certification device 50 with a private key 51, which has a public component, also called a public key 52.

In the case of the first machine 10, an external device 4 is arranged externally to the machines 10, 20. The device 4 is in particular unknown to the machine 10, for the reasons explained in more detail below. Therefore, the machine 10 and the external device 4 cannot communicate with each other, as illustrated by the crossed-out line 5 in FIG. 1. On the other hand, each of the machines 10, 20 can exchange any type of data 41, 42 with a higher-level device 8, as illustrated by the dash-dotted arrows in FIG. 1 and as described in more detail below.

The system 1 is an industrial plant, in particular. An industrial plant is, for example, a dismantling and/or assembly plant or other manufacturing plant, in which objects 2 consisting of at least one single component are treated, such as painted or polished, visually or otherwise inspected, cut into pieces, etc. or fabricated in any way, and/or objects 2 consisting of at least two components are assembled and/or dismantled. Various treatment methods can be used, such as joining methods, in particular welding, screwing, riveting, nailing, etc., or techniques such as sawing, etching, punching, pressing, drilling, laminating, melting, printing, etc.

For example, the machine complex 3 can be formed by a transporting machine 10 for transporting components to a joining machine 20. Of course, other examples are also conceivable.

The machines 10, 20 and the device 8 can be connected in a wired and/or wireless manner via a bus system. In particular, the machines 10, 20 and the device 8 are connected via the internet or an intranet, etc. The device 8 is, for example, a higher-level control device and/or a data management system and/or a company's central computer system, which is connected to a plurality of company sites where different machine complexes 3 with the machines 10, 30 and/or individual machines 10, 20 are installed. Alternatively, the device 8 is a cloud. The device 8 may also store and use data from other machines or industrial plants. This means that a plurality of data items must be managed both in each machine 10, 20 and in the externally arranged device 8.

The first machine 10 has a local certification device 11 with a certificate authority, and a machine part 12 with at least one device 121, 122, . . . , 12N-1, 12N. The devices 121, 122, . . . , 12N-1, 12N can be of the same type or have different designs and/or functions as described above in examples.

For example, the local certification device 11 can be formed by a control device which controls at least one of the devices 121 to 12N. The local certification device 11 is responsible for issuing certificates for all devices 121 to 12N. However, the local certification device 11 is also dependent on a somewhat more global certification device 50, as explained below.

The machine 10 has a root certificate 101. At least one private key 1100 for the local certification device 11 is kept and securely stored in the local certification device 11. Each private key 1100 has a public component, the so-called public key 1110. Device certificates 111 to 11N are available for the devices 121 to 12N. This is described in more detail in the following.

The device 121 has a module 131 in which at least one private key 141 for the device 121 is kept and stored securely. Likewise, the devices 122, ..., 12N-1, 12N each have a module 132, ... 13N-1, 13N, in which at least one private key 142 for the associated device 122, ..., 12N-1, 12N is kept and stored securely. The at least one private key 141 to 14N is protected from being read out of the associated module 131 to 13N. The buyer or operator of the devices 121 to 12N can generate their own private keys 141 to 14N in the desired module 131 to 13N and use them for their own purpose. Each private key 141 to 14N has a public component, which is referred to as a public key.

The devices 121 to 12N cooperate to solve at least one task, such as drilling holes into at least one component, so that two components aligned with the openings can be assembled as object 2. For this purpose, a robot, for example the device 121, must be controlled and driven to hold the component in a predetermined position, and to operate a tool so that the opening is produced, for example by drilling or milling or punching and/or etching and/or any other suitable method. In the process at least two of the devices 121 to 12N exchange data 15, 16, 17 with each other, such as sensor data, i.e. actual values from the operation of the robot, such as its position in space, etc. and/or of the tool. In addition, data such as control commands with setpoint values are exchanged for controlling a drive of the robot or the tool, or similar data as the data 15, 16, 17. The sensor data can contain at least one physical variable that is detected during the operation of the machine 10.

If it is not necessary for a device 121 to 12N to send data to the device 8 or to the machine 20, then it is not mandatory that a sub-certificate be issued for the device 121 to 12N, as described below for the other devices 121 to 12N. However, in order to create an unbroken chain of trust, it is advantageous to grant sub-certificates to each of the devices 121 to 12N.

The second machine 20 has an optional local certification device 21 with a certificate authority. In any case, the second machine 20 has a machine part 22 with at least one device 221, 222, ..., 22N-1, 22N. The devices 221, 222, ..., 22N-1, 22N can be of the same type or have different designs and/or functions as described above in examples.

For example, the local certification device 21 can be formed by a control device of the machine 20 which controls at least one of the devices 221, 222, ..., 22N-1, 22N. The machine 20 has a root certificate 201. At least one private key 2100 for the local certification device 21 is kept and securely stored in the local certification device 21. Each private key 2100 has a public component, the so-called public key 2110. Device certificates 211 to 21N are available for the devices 221, 222, ..., 22N-1, 22N. This is described in more detail in the following. The device 221 has a module 231 in which at least one private key 241 for the device 221 is kept and stored securely. Likewise, the devices 222, ..., 22N-1, 22N each have a module 232, ... 23N-1, 23N, in which at least one private key 241 for the associated device 222, ..., 22N-1, 22N is kept and stored securely. The at least one private key 241 to 24N is protected from being read out of the associated module 231 to 23N. The buyer or operator of the devices 221 to 22N can generate their own private keys 241 to 24N in the desired module 231 to 23N and use them for their own purpose. Each private key 241 to 24N has a public component, which is referred to as a public key.

The devices 221 to 22N cooperate to solve at least one task. This can be carried out in a similar way as previously described for devices 121 to 12N of the machine 10. In the process at least two of the devices 221 to 22N exchange data 25, 26, 27 with each other, such as sensor data, i.e. actual values from the operation of the robot, such as its position in space, etc., and/or of the tool. In addition, data such as control commands with setpoint values for controlling a drive of the robot or the tool are exchanged, or similar, as the data 25, 26, 27. The sensor data can contain at least one physical variable that is detected during the operation of the machine 20.

As mentioned already, the certification device 50 has a private key 51. The private key 51 has a public component, the so-called public key 52. Based on the private key 51, the certification device 50 issues a root certificate 101 for the first machine 10 on request from the machine complex 3 or the machine 10, and sends it to the machine 10. The certification device 50 generates the root certificate 101 based on its private key 51. For this purpose, the certification device 50 signs the request from the machine complex 3 or machine 10 with the private key 51 and thus creates the root certificate 101. The root certificate 101 is therefore a trusted certificate 101 for the machine 10.

The root certificate 101 of the machine 10 is stored and/or installed, in particular, in a data server or the local certification device 11 of the machine 10. In addition, the certification device 50 provides the root certificate 101 of the machine 10 for the device 8. Optionally, the certification device 50 provides the certificate 101 for the machine 20 if the machines 10, 20 are to exchange data 30.

The certification device 50 then sends a request to the local certification device 11 to query the identity of the certification device 11. In response, the local certification device 11 sends a certification request to the certification device 50, which confirms or signs the certification device 50 with the root certificate 101 of the machine 10. As a result, a sub-certificate 110 is issued for the local certification device 11. The sub-certificate 110 is stored in the local certification device 11.

Then, the local certification device 11 can send a request to all devices 121 to 12N to query the identity of each of the devices 121 to 12N. In response, the respective device of the devices 121 to 12N sends a certification request to the certification device 11, which confirms or signs the certification device 11 with the root certificate 110 of the certification device 11. As a result, a sub-certificate 111 to 11N is issued for each device of the devices 121 to 12N. Each device 121 to 12N stores its sub-certificate 111 to 11N as described above. Alternatively, the certification device 11 can confirm or sign the certification request from at least one device 121 to 12N with the root certificate 101 of the machine 10. In such a case, the root certificate 101 of the machine 10 must also be available in the local certification device 11, in particular, stored and/or installed.

In addition, the certification device 50 issues a root certificate 201 for the second machine 20 based on its private key 51. This is performed for the machine 20 in the same way as previously described for the first machine 10.

The root certificate 201 of the machine 20 is stored, in particular, in a data server or other secure memory of the machine 20 and/or installed in another secure component of the machine 20. In addition, the certification device 50 provides the root certificate 201 of the machine 20 for the device 8. Optionally, the certification device 50 provides the certificate 201 for the machine 10 if the machines 10, 20 are to exchange data 30.

If a local certification device 21 is present on the machine 20, the certificates 210 to 21N are created as described previously with regard to machine 10. As a result, a sub-certificate 210 is issued for the local certification device 21. The sub-certificate 210 is stored in the local certification device 21. In this case, the local certification device 21 is responsible for issuing certificates 211 to 21N for all devices 221 to 22N. However, the local certification device 21 is also dependent on the somewhat more global certification device 50, as explained below.

If, on the other hand, there is no local certification device 21 available for at least one device 221 to 22N, the certificates 210 to 21N are created as follows. In such a case, the certification device 50 sends a request to all devices 221 to 22N for which no local certification device 21 is available. In response, these devices 221 to 22N send a certification request to the certification device 50, which confirms or signs the certification device 50 with the root certificate 201 of the machine 20. As a result, a sub-certificate 211 to 21N is issued for each device of the devices 221 to 22N. Each device 221 to 21N stores its sub-certificate 211 to 21N as described above.

In the operation of the individual machines 10, 20 or the machine complex 3, the devices 121 to 12N exchange data 15, 16, 17 with each other using the certificates 111 to 11N. In this case, the respective device 121 to 12N provides the data 15, 16, 17 sent by the device with the corresponding certificate 111 to 11N of the device 121 to 12N, so that the transmitted data 15, 16, 17 are biuniquely identified. Each certificate 111 to 11N is individual to each device. Each certificate 101, 110 to 11N is unique and is generated and issued for a forgery-proof identity. Each certificate 101, 110 to 11N is thus only present once and differs from all other certificates 101, 111 to 11N. Every certificate 101, 110 to 11N is confirmed by an official or trustworthy body, i.e. not just locally and self-signed. For example, the device 121 labels data 15 that is to be sent to the device 122 with the corresponding certificate 111. This makes the data 15 identifiable as data from the device 121 at a later time, even if the data 15 were to be forwarded to the device 12N-1, for example, as data 16.

The data 15, 16, 17 can comprise parameters that can be used in the control of a drive of at least one element of the machine 10, such as an axle or shaft, or of a device 121 to 12N, such as a robot, a conveyor belt, etc. of the machine 10.

In addition or alternatively, the data 15, 16, 17 comprise an IP address and/or a name of the at least one device 121 to 12N. As a result, the data 15, 16, 17 can be specified even more precisely.

In addition, the device 121 can send the data 15 to the device 8 as data 41 and/or to the machine 20 as data 30. The same applies to the communication between other devices 121 to 12N of the machine 10 and/or to the device 8 and/or to the machine 20.

In addition, the devices 221 to 22N exchange data 25, 26, 27 with each other using the certificates 221 to 22N in the operation of the machine 20 or the machine complex 3. In this case, the respective device 221 to 22N provides the data 25, 26, 27 sent by the device with the corresponding certificate 211 to 21N of the device 221 to 22N, so that the transmitted data 25, 26, 27 are biuniquely identified. Each certificate 211 to 21N is individual to each device 221 to 22N. Each certificate 211 to 21N is unique and is generated and issued for a forgery-proof identity. Each certificate 211 to 21N is thus only present once and differs from all other certificates 201, 210 to 21N. Every certificate 201, 210 to 21N is confirmed by an official or trustworthy body, i.e. not just locally and self-signed. For example, the device 221 labels data 25 that is to be sent to the device 222 with the corresponding certificate 211. This makes the data 25 identifiable as data from the device 221 at a later time, even if the data 25 were to be forwarded to the device 22N-1, for example, as data 26.

The data 25, 26, 27 can comprise parameters that can be used in the control of a drive of at least one element of the machine 20, such as an axle or shaft, or of a device 221 to 22N, such as a robot, a conveyor belt, etc. of the machine 10.

In addition or alternatively, the data 25, 26, 27 comprise an IP address and/or a name of the at least one device 221 to 22N. As a result, the data 25, 26, 27 can be specified even more precisely.

In addition, the device 221 can send the data 25 to the device 8 as data 42 and/or to the machine 10 as data 30. The same applies to the communication between other devices 221 to 22N of the machine 20 and/or to the device 8 and/or to the machine 10.

In the system, therefore, either the certification device 50 or a local device 11, 12 issues a certificate for each new device, which is incorporated into the associated machine 10, 20 during commissioning. The certificate 111 to 11N for a device 121 to 12N of the machine 10 is a sub-certificate of the certificate 101 of machine 10. The certificate 211 to 21N for a device 221, 222, ..., 22N-1, 22N of the machine 20 is a sub-certificate of the certificate 201 of the machine 20.

Thus, for example, the machine 10 has issued the certificate 11N-1 to the device 12N-1 during the commissioning of the device 12N-1 in machine 10. Only after the certificate 11N-1 has been granted can the device 12N-1 enter into communication with the other devices 121, 122, ..., 12N. In addition, it is only then possible for the device 12N-1 to communicate with the machine 20. The same applies to communication with the device 8. In order for the device 12N-1 to communicate with the device 8, the certificate 11N-1 must be issued with the root certificate 101 of the machine 101. Otherwise, the certificate 110 of the local certification device must also be stored in the device 8.

The certificate 101 for the first machine 10 and the certificate 201 for the second machine 20 are stored in the device 8. Thus, data identified with a sub-certificate 111, 112, ..., 11N-1, 11N from a device 121, 122, ..., 12N-1, 12N of the first machine 10 are uniquely identifiable as data 15, 16, 17 of a device 121, 122, ..., 12N-1, 12N of the first machine 10. In addition, data 25, 26, 27 identified with a sub-certificate 211, 212, ..., 21N-1, 21N from a device 221, 222, ..., 22N-1, 22N of the second machine 20 are uniquely identifiable as data 25, 26, 27 of a device 221, 222, ..., 22N-1, 22N of the second machine 20.

In the device 8 it is therefore possible to determine from which device 121, 122, ..., 12N-1, 12N, 221, 222, ..., 22N-1, 22N, which machine 10, 20 and which machine complex 3, e.g. plant, etc., the data 15, 16, 17, 25, 26, 27 originate.

This ensures a chain of trust. As a result, any manipulation of data 15 to 17, 30, 41 by external devices, such as the device 4, is at least more difficult if not impossible.

As a result, the first machine 10 with the certificate 101 for the first machine 10 can be identified externally as a logical unit. In addition, the second machine 20 with the certificate 201 for the second machine 20 is identifiable externally as a logical unit. Here it is sufficient to store on the device 8 only the machine identity in the form of the root certificate 101, 201 of the respective machine 10, 20. It is not necessary to store a certificate on the device 8 for every trusted subscriber or device 11, 12, 121 to 12N, 221 to 22N of the machine 10, 20. This means that the trustworthy communication in the machine complex 3 and to the external device 8 is significantly simpler than in the variant in which a certificate must be stored on device 8 for each of the devices 11, 12, 121 to 12N, 221 to 22N and then checked.

Figure 2:
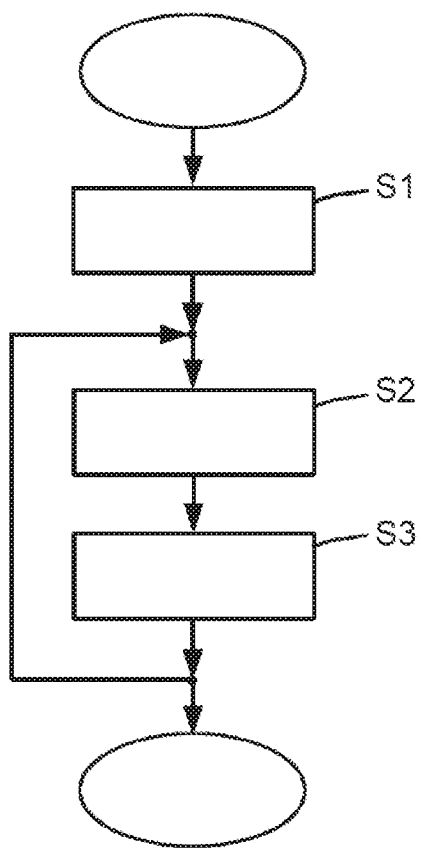
FIG. 2 shows a flow diagram of a method for configuring a machine according to the first exemplary embodiment.

As shown in FIG. 2, the machines 10, 20 are issued with the root certificate 101, 201 by the certification device 50 in a step S1, during the configuration and/or commissioning of the machine 10, 20 as described above. In this case, the association with the machine complex 3 can be made, for example, by way of the IP address and the associated subnet. In detail, the certificate device 50 receives the prompt to generate or query the machine identity. This is performed via a web front-end or rest-request (command). The certification device 50 then generates the machine root certificate 101 or 201 on the basis of its private key. In addition, the root certificate 101, 201 can be transferred to the device 8 and/or the respective other machine 20, 10. The flow then proceeds to step S2.

In step S2, during the configuration and/or commissioning of the individual devices 121 to 12N, 221 to 22N of the machines 10, 20, the respective certificates 111 to 11N, 211 to 21N of the individual devices 121 to 12N, 221 to 22N are assigned and stored in the devices 121 to 12N, 221 to 22N. For this purpose, the certification device 50 automatically sends requests to all network nodes of the machine complex 3 via broadcast or rest-request (Representational State Transfer) to query their identity. The relevant machine components or the aforementioned devices 11, 12, 121 to 12N, 221 to 22N then send a certificate signing request at the instigation of the certification device 50, which the certification device 50 confirms/signs using the root certificate 101, 201, as described above. The sub-certificates 110 to 11N, 210 to 21N of the machine components or of the aforementioned devices 11, 12, 121 to 12N, 221 to 22N are thus issued. The machine association can thus be verified very easily with the aid of the machine root certificate 101, 201. In addition, individual device identities can continue to be verified on the basis of the individual sub-certificates 110 to 11N, 210 to 21N of the devices 11, 12, 121 to 12N, 221 to 22N as required. The flow then proceeds to a step S3.

In step S3, each device 121 to 12N, 221 to 22N of the machine 10, 20 is configured such that during an exchange of data 15 to 17, 25 to 27, 30, 41, 42 with another device 121 to 12N, 221 to 22N of the machine 10, 20 or of the other machine 20, 10 or the higher-level device 8, an exchange of data 15 to 17, 25 to 27, 30, 41, 42 is permitted only if the data 15 to 17, 25 to 27, 30, 41, 42 are provided with a sub-certificate 111 to 11N, 211 to 21N. The sub-certificate 111 to 11N, 211 to 21N must have been issued by the certification device 11, 21. The flow then returns to step S2.

Once all devices 121 to 12N, 221 to 22N have been issued with a certificate 111 to 11N, 211 to 21N, the procedure is finished.

The certificate distribution within the machine complex 3 is thus carried out automatically. In addition, the certificates 101, 110 to 11N, 201, 210 to 21N are not only created automatically, but also distributed and refreshed automatically.

Thus, in order to trust an entire machine 10, 20 or its machine complex 3, a file transfer of the machine certificate 101, 201 to higher-level or higher-ranked systems takes place upon the above-mentioned request for generating or querying the machine identity. This can be carried out manually by the user downloading the machine identity specifically from the certification device 50. Such a user is usually personnel involved in commissioning or maintaining the machine 10, 20. Alternatively, the machine identity can be automatically reported to the certification device 50. The automated notification could be carried out via an appropriate interface, in particular, a web interface.

Figure 3:
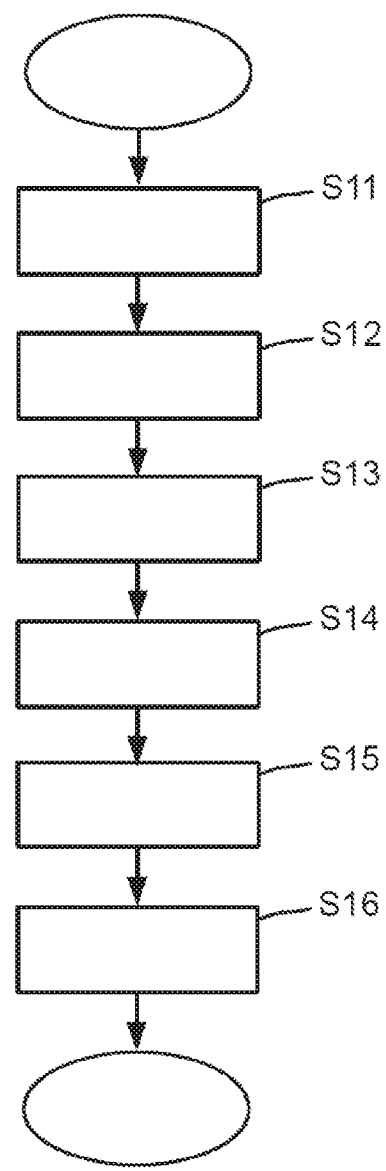
FIG. 3 shows a flowchart of a method for operating a machine according to the first exemplary embodiment.

As shown in FIG. 3, in a method for operating a machine, for example, the machine 10, after the start of the procedure in a step S11 with a device, in particular the device 122, for example, operating state data is recorded as data 16 and prepared for transmission. The operating state data are, in particular, a position of the robot in space, a steam pressure in a boiler or a position of a valve piston, or the size of an electrical current, or the offset relative to an alignment mark, or any other physical quantity. The flow then proceeds to a step S12.

In step S12, the operating state data is issued with the certificate of the device that collected the operating state data. In the above example, the device 122 provides its operating state data with the certificate 112, i.e. the data 16, for example. The flow then proceeds to a step S13.

In step S13 the data identified in step S12 is sent to the device 12N as data 16, for example, so that the data 16 can be used, for example, by a drive control unit A1 of the device 12N for controlling a drive A2. The flow then proceeds to a step S14.

In step S14, the device 12N receives the data 16 and checks the data 16 to determine whether the data 16 is trustworthy data. If the data 16 is accompanied by a certificate 112, the device 12N accepts the data 16 as trustworthy. Otherwise, the device 12N discards the data 16 as untrustworthy data. For example, the device 12N would discard data from external device 4 as untrustworthy data, because the external device 4 cannot add a certificate to its data which is trusted by the devices of the machine 10. The flow then proceeds to a step S15.

In step S15, the data 16 identified in step S12 is sent, for example as data 41, to the device 8 so that the data 16 can be evaluated in the device 8, for example by means of a display device. The flow then proceeds to a step S16.

In step S16, the device 8 checks the certificate attached to the data 16 using the root certificate of the machine 101. In this example, the device 8 checks the certificate 112 with the root certificate 101 of the machine 10. Since the certificate 112 is accompanied by the root certificate 101 of the machine 10, the device 8 accepts the data 16 as trustworthy. This means that the data 16 can be further processed. Otherwise, the data 16 is discarded and the device 8 issues a warning message to a user of the device 8 and/or to the machine complex 3.

At this point, the procedure is finished.

According to a second exemplary embodiment, an additional certification level for the machine complex 3 and/or the system 1 is added. Thus, in the second exemplary embodiment the root certificates 101, 201 of FIG. 1 would be sub-certificates of the machine complex 3 and/or the system 1.

As a result, the machine complex 3 and/or system 1 can also be identified as a "unit".

Otherwise, the system 1 according to the present exemplary embodiment is constructed in the same way as described above in relation to the first exemplary embodiment.

All previously described embodiments of the system 1, the machine complex 3, the machines 10, 20 and the method executed using them can be used individually or in all possible combinations. In particular, all features and/or functions of the previously described exemplary embodiments can be combined as required. In addition, in particular the following modifications are conceivable.

The parts shown in the figures are illustrated schematically and may differ in their exact embodiment from the forms shown in the figures, as long as their features described above are guaranteed.

For example, the communication, in other words, the exchange of data 15, 16, 17, 25, 26, 27, 30 in the system 1 can take place at least partly in a wired manner or at least partly wirelessly. It may be possible to provide alternative or additional means for implementing a near-field communication and/or a long-range communication, which can be selected during a basic parameterization of at least one of the devices 121 to 12N, 221 to 22N and the radio radius of which can be adjusted by means of adjustable radio module parameters.

What is claimed is:

1. A system comprising:
    at least one machine including at least one device configured to exchange data with another device of the at least one machine or of another machine for a joint solution of a task or with a higher-level device; and
    a certification device configured to identify the at least one machine with a root certificate of the at least one machine and to grant a sub-certificate to the at least one device of the machine,
    wherein the at least one device has a private key containing a public key, the at least one device being configured to send the public key to the certification device so that the certification device issues the sub-certificate, and
    wherein the certification device is further configured to (i) generate the sub-certificate by signing data that includes the public key of the at least one device with the root certificate of the at least one machine in order to identify the at least one device as belonging to the at least one machine, and (ii) issue the sub-certificate biuniquely for the at least one device.

2. The system according to claim 1, wherein:
    the certification device has a private key containing a public key, and
    the certification device is configured to use the private key for signing the root certificate for the at least one machine.

3. The system according to claim 1, wherein a first device of the at least one device is a control device, and a second device of the at least one device is a drive device, a tool, or a transport device.

4. The system according to claim 1, wherein the at least one device of the machine is configured, during an exchange of the data with the other device of the machine or of the other machine or of the higher-level device, to permit the exchange of the data only when the data are provided with the sub-certificate, which is signed with the root certificate.

5. The system according to claim 4, wherein the data are operating state data or comprise a control command of the at least one device.

6. The system according to claim 4, wherein the data comprise parameters for controlling a drive of at least one element of the at least one machine, and/or the data comprise an IP address and/or a name of the at least one device.

7. The system according to claim 1, further comprising:
    a further device arranged externally to the at least one machine and configured to store the root certificate of the at least one machine, and to check the data received from the at least one device of the at least one machine for trustworthiness using the root certificate of the at least one machine.

8. A machine comprising:
    at least one device configured to exchange data with another device of the machine or another machine for a joint solution of a task or with a higher-level device, the at least one device having a private key containing a public key; and
    a certification device configured to (i) receive the public key of the at least one device from the at least one device, (ii) to generate a sub-certificate by signing data that includes the public key of the at least one device with a root certificate of the machine that was issued by a higher-level certification device, and (iii) to issue the sub-certificate to the at least one device of the machine biuniquely for the at least one device to identify the at least one device as belonging to the machine.

9. A method for configuring a system having at least one machine, which comprises (i) at least one device for exchanging data with another device of the at least one machine or with another machine for a joint solution of a task or with a higher-level device, the at least one device having a private key containing a public key, and (ii) a certification device, the method comprising:
    identifying, using the certification device, the at least one machine with a root certificate;
    receiving, with the certification device, the public key of the at least one device from the at least one device;
    generating, using the certification device, a sub-certificate by signing data that includes the public key of the at least one device with the root certificate of the machine in order to identify the at least one device as belonging to the at least one machine;
    granting, using the certification device, the sub-certificate to the at least one device of the at least one machine; and
    issuing biuniquely the sub-certificate for the at least one device.

10. The method as claimed in claim 9, further comprising:
    preparing data using the at least one device for sending to the other device which is arranged externally to the at least one machine and which stores the root certificate of the at least one machine;
    adding the sub-certificate to the prepared data,
    signing the sub-certificate with the root certificate of the certification device of the at least one machine in order to identify the at least one device as belonging to the at least one machine;
    checking, using the other device, the data received from the at least one device of the at least one machine for trustworthiness with the root certificate of the at least one machine.

* * * * *